United States Patent Office 3,301,317
Patented Jan. 31, 1967

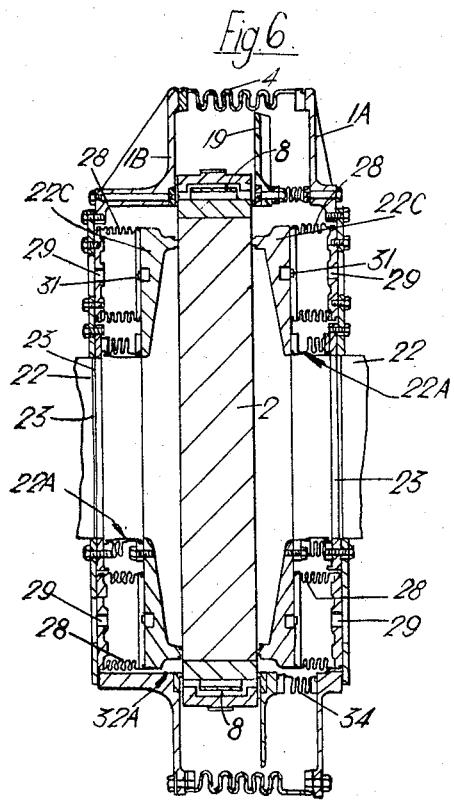
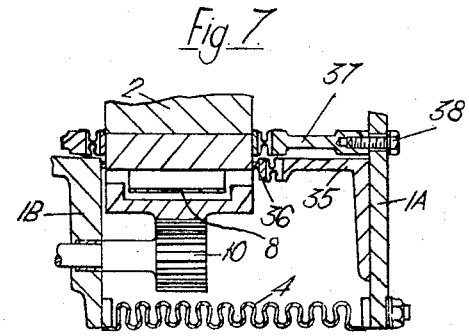

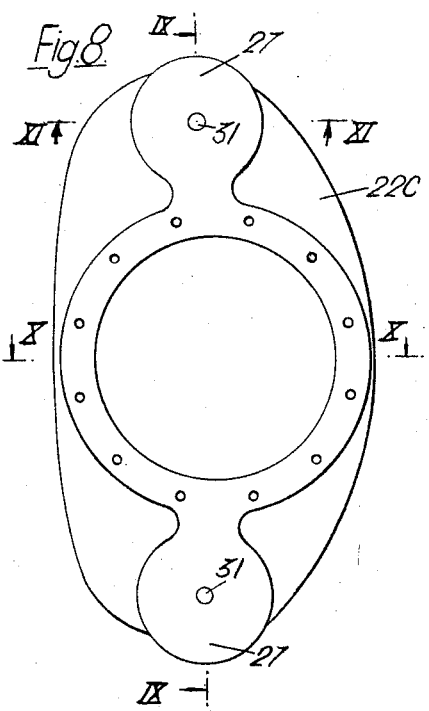
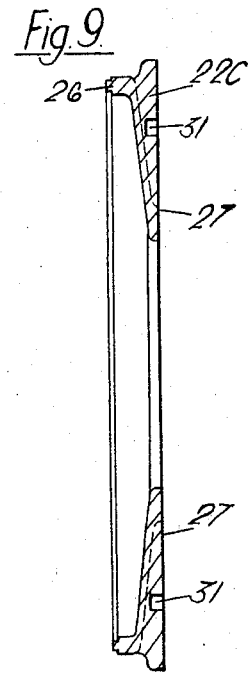
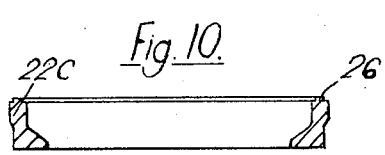
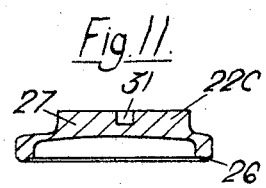
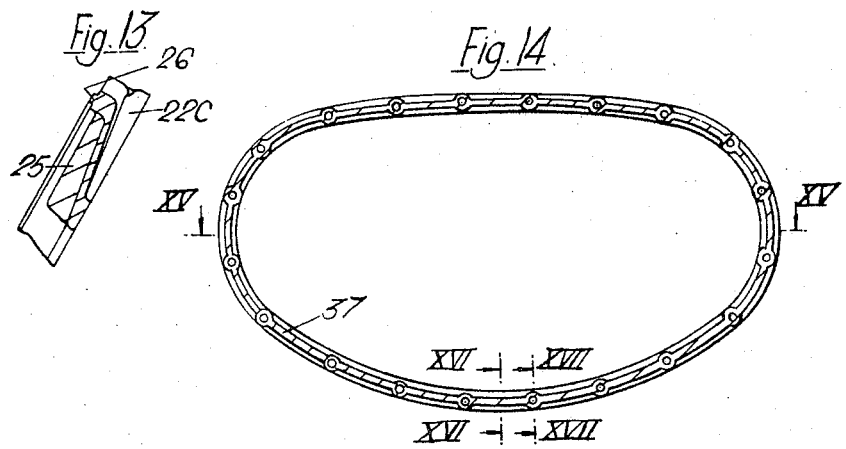

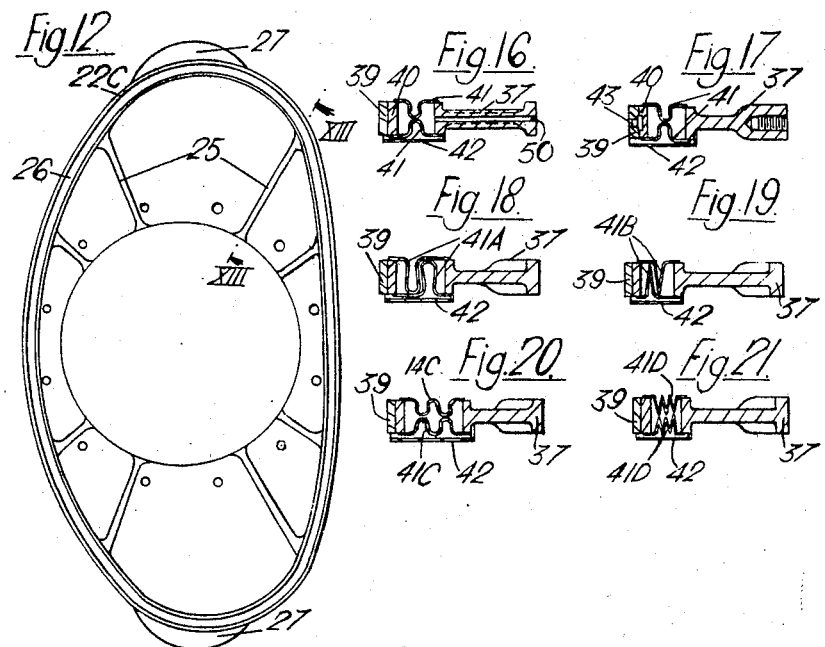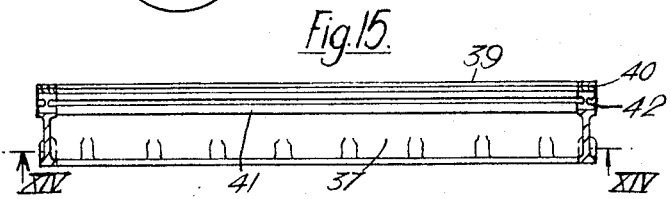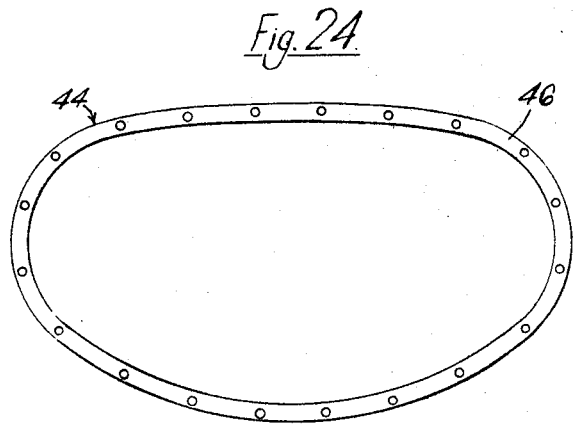

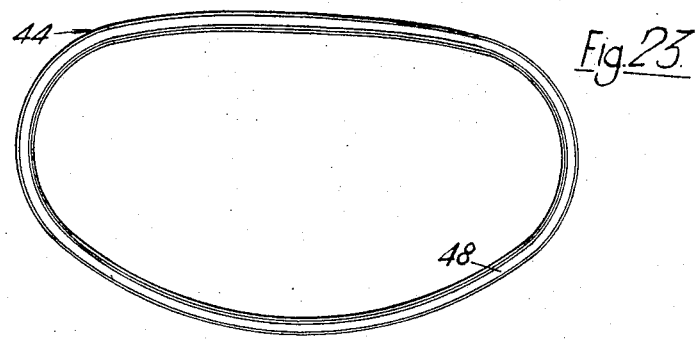
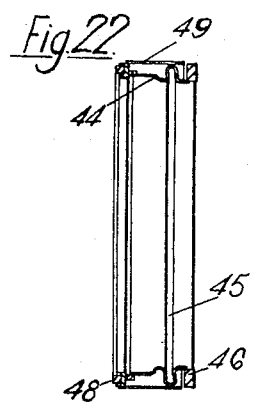
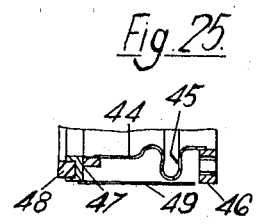
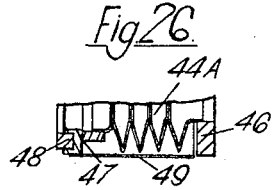
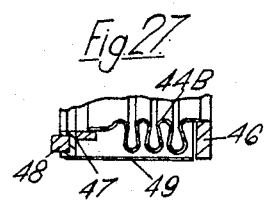

3,301,317
THERMAL REGENERATORS
John H. Weaving, Knowle, Solihull, William R. Bourn, Moseley, Birmingham, and Willie S. Emmett, Kings Norton, Birmingham, England, assignors to The Austin Motor Company Limited, Birmingham, England
Filed Sept. 21, 1964, Ser. No. 397,943
Claims priority, application Great Britain, Sept. 24, 1963, 37,487/63
4 Claims. (Cl. 165—8)

This invention relates to thermal regenerators, otherwise known as regenerative heat-exchangers, of the kind employing a rotary disc-type matrix.

Regenerative heat-exchangers, either of the rotary disc or rotary drum type, are used in gas turbine units to extract heat from the exhaust gases, and to transfer this heat to the output air from the compressor associated with the gas turbine unit. The matrix of the heat-exchanger is designed to present a large surface area to the flow of the gases, and is mounted in a casing in such a way that it can be rotated so that its surface area is presented first to the hot exhaust gases, under which condition it heats up, and subsequently to the air from the compressor, so that it is cooled down, thus transferring heat. Usually, a duct carrying the intake-air for the turbine, from the compressor outlet, is arranged to abut a portion of the surface of the matrix through a sealing device, and a second coaxial duct on the opposite face of the matrix conveys the intake-air (which has passed through the matrix) to the combustion chamber of the gas turbine; a similar pair of ducts conveying the exhaust gases from the turbine through the matrix and to atmosphere. In this way an amount of fuel equivalent to the quantity of heat transferred is saved.

A major difficulty is encountered in the sealing of the two pairs of ducts under the arduous conditions that exist in the gas turbine, namely, air at a pressure of several atmospheres and at a moderate temperature, and exhaust gas at high temperature and low pressure. Under these conditions distortion tends to occur between the seals and the faces of the matrix, and it is the purpose of this invention to minimize leakage through those seals, and also between the respective ducts and the atmosphere.

The invention comprises a regenerative heat-exchanger of the kind having a rotary disc-type matrix enclosed in a casing, and designed to transfer heat from the exhaust gases of a gas turbine to the intake-air supplied to the turbine by an associated compressor; in which the casing contains aligned intake-air ducts which have a substantially elliptical cross-section where they resiliently abut opposite faces of the matrix through interposed fluid-pressurized sealing means conforming to the contour of the associated duct and enclosing approximately from one-third to one-half of the face area of the matrix, and in which the intake-air ducts within the casing are entirely surrounded by, and are in contact with, the exhaust gases flowing through the casing.

In the preferred embodiment of the invention the casing of the heat-exchanger comprises two main castings of substantially circular form, spaced apart axially by at least three tie members which constrain them from axial separation, and interconnected by a cylindrical heat-resistant bellows sealing the casing at its periphery.

The sealing means associated with each of the quasi-elliptical intake-air ducts within the casing of the heat-exchanger comprises thin flexible facing material compatible with the rotating disc on which it abuts. When this material is metallic it may be in the form of an annulus brazed on to a small bellows device which follows the contour of the quasielliptical duct. The bellows device is pressurized by air or other fluid, either from the compressor or a separate source of pressure, and by this means the thin sealing facing is constrained to accommodate any distortion in the disc on which it bears. In the case of non-metallic sealing material, where attachment to a thin metal bellows may be difficult, the sealing material may first be fixed to a metallic backing plate which, in turn, is fixed to the bellows device. Alternatively, the sealing material may be retained by a metal channel fixed to the bellows device. Fluid-pressurized seals are used on both the intake-air ducts where they abut the disc, and similar seals may be used for the exhaust duct which surrounds the inlet air ducts; but, if the space available is to confined, a fluid-pressurized seal at this position may be eliminated, as leakage on the exhaust side is less detrimental than on the intake-air side, owing to its low pressure.

The fluid for pressurizing the seals may be a gas or liquid, and, when desirable, may be used for cooling the seals to minimize distortion.

Referring to the accompanying drawings:

FIGURE 3A is a fragmentary sectional side elevation of a detail of the heat-exchanger assembly;

FIGURE 6 is a section, to a reduced scale, on the line VI—VI in FIGURE 1;

FIGURE 7 is a fragmentary sectional view of a modification;

FIGURE 8 is an end view of the exterior of an air duct that forms part of the assembly illustrated in FIGURE 5;

FIGURES 9, 10 and 11 are sections on the lines IX—IX, X—X and XI—XI respectively in FIGURE 8;

FIGURE 12 is an end view of the interior of the air duct shown in FIGURE 8;

FIGURE 13 is a fragmentary section on the line XIII—XIII in FIGURE 12;

FIGURES 14 and 15 are views of another design of air duct, FIGURE 14 being a section on the line XIV—XIV in FIGURE 15, and FIGURE 15 a section on the line XV—XV in FIGURE 14;

FIGURES 16 and 17 are sections on the lines XVI—XVI and XVII—XVII respectively in FIGURE 14;

FIGURES 18 to 21 show alternative arrangements to the sections depicted in FIGURES 16 and 17;

FIGURE 22 is a sectional elevation of an alternative design of air duct to that shown in FIGURE 14;

FIGURES 23 and 24 are views of opposite ends of the duct shown in FIGURE 22;

FIGURE 25 is an enlarged fragmentary view of the duct shown in FIGURE 22; and

FIGURES 26 and 27 depict alternative forms of construction to that shown in FIGURE 25.

Figure 1:
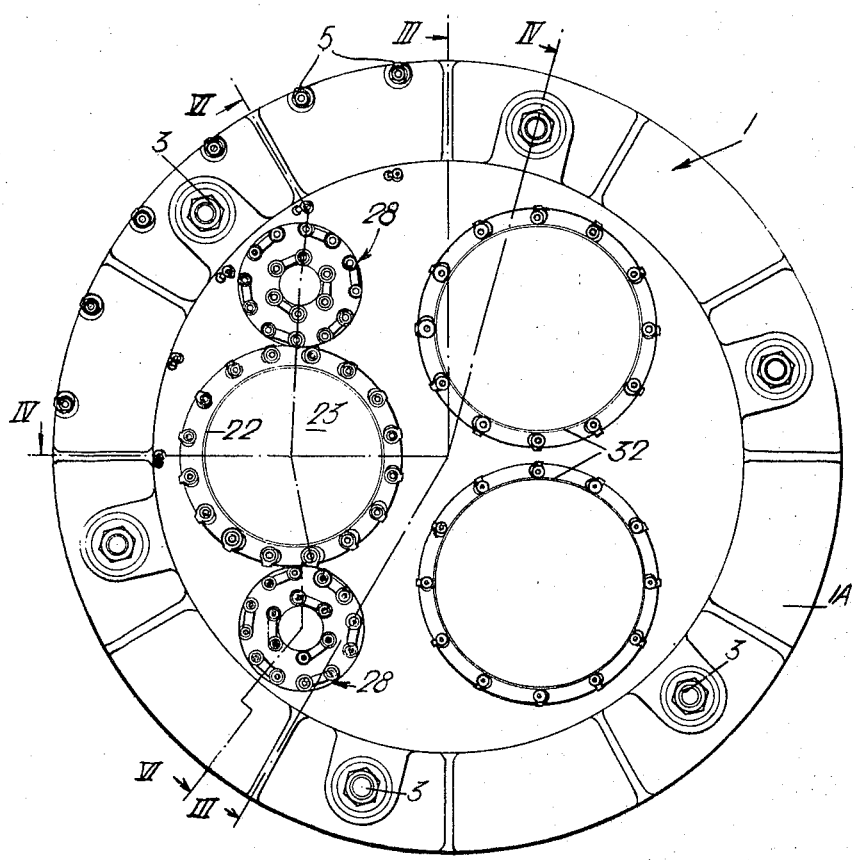
FIGURES 1 and 2 are elevations of opposite ends of a rotary disc-type regenerative heat-exchanger constructed in accordance with the invention.
Figure 2:
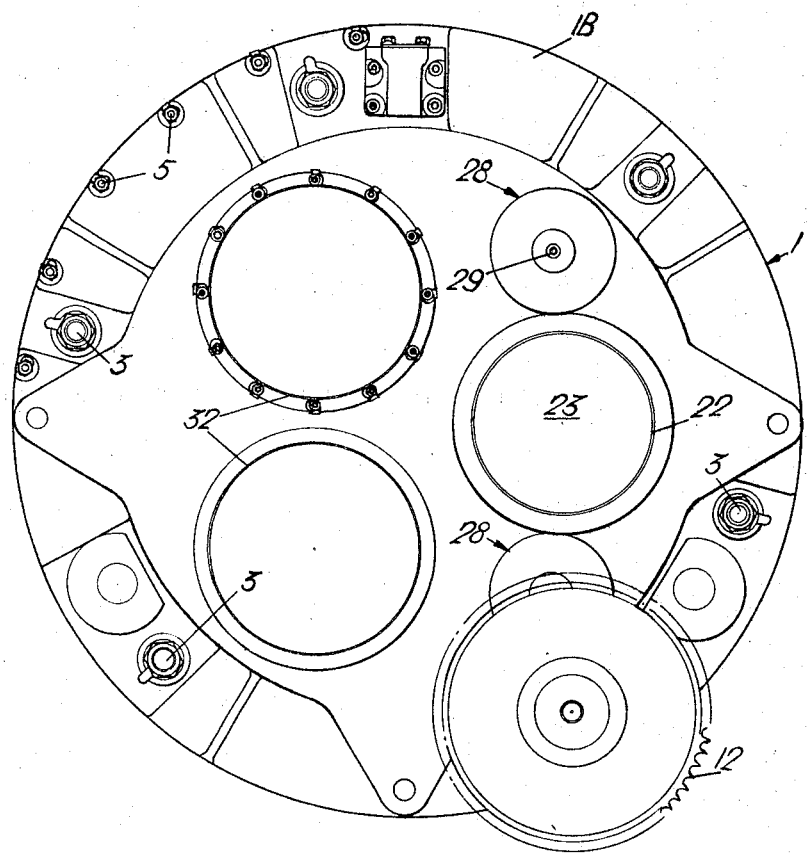

Referring to the embodiment illustrated in FIGURES 1 to 6, the heat-exchanger has a substantially cylindrical casing 1 comprising two main castings 1A and 1B, of substantially circular form, these two casing parts being concentric with the axis of a disc-type matrix 2, and being spaced apart rigidly by means of shouldered tie members 3 (see FIG. 4) which constrain them from axial separation. The casing 1 is sealed at the periphery by a cylindrical metal bellows 4, which is secured to the casing parts 1A and 1B by bolts 5 (FIGS. 1 and 2), only a few of these being shown.

The matrix 2 comprises an annular foraminous core of ceramic material affording a multitude of axially-directed fluid-flow passages; this core being held between rings 6 and 7 (FIG. 3) of ceramic material. A resilient drivetransmitting device 8 (FIG. 3A) of heat-resistant alloy is arranged in an annular gap 6A between the ceramic ring 6 and a ring gear 9. The device 8 comprises a cylindrical band coaxial with the matrix 2, and carrying several equi-spaced pairs of cantilever-like resilient tongues 8A; the tongues of each pair lying at opposite sides of the band 8, and respectively effecting frictional engagement with the periphery of the ring 6 and with the inner periphery of the ring gear 9. The later meshes with a pinion 10 on the spindle 11 of a driving sprocket 12, by which the matrix 2 is rotated continuously when the heat-exchanger is in operation. The matrix assembly is centralised, and supported, by three equi-spaced sets of double rollers 13 (FIGS. 3 and 5) which bear upon the rim of the assembly. Two of these sets of rollers are rigidly mounted, but the other set is flexibly mounted; its spindle 13A (FIG. 3) being located in radial slots 13B and loaded by helical compression springs 13C. The space within the inner ring 7 of the matrix 2 is sealed by flanged closure plates 14 which are interconnected by a tension spring 15 associated with a bolt-like fastening 16.

The casing part 1B has bolted to it an annular seal 17 (FIGS. 3 and 4) which bears upon the adjoining side of the ceramic ring 6 of the matrix 2. The opposite side of that ring is likewise engaged by a corresponding seal 18, which is bolted to an annular plate 19 that is mounted in floating manner on the tie members 3. The plate 19 has radial slots 20 (FIG. 4) which receive the tie members 3, and which serve to accommodate movement due to differential expansion. Helical compression springs 21, trapped between the casing part 1A and the plate 19, maintain the seals 17 and 18 in contact with the respective faces of the matrix 2; these springs being so arranged that the forces exerted by them can be adjusted as required.

The air which is supplied by the compressor (not shown) of the gas turbine unit, and which, after passage through the heat-exchanger 1, is to be delivered to the combustion chamber of the gas turbine, may conveniently be designated the intake-air. It is conveyed to and from the heat-exchanger by a coaxial pair of intake-air ducts 22 registering with corresponding apertures 23 in the casing parts 1A and 1B, to which these ducts are respectively bolted.

Inside the casing of the heat-exchanger, the intake-air is conveyed through ducts 22A (see FIG. 4) which resiliently abut opposite faces of the matrix 2, and which, in effect, constitute extensions of the ducting 22. The ducts 22A are of composite construction, each comprising a short cylindrical duct 22B and an adjoining shell-like duct 22C; the axial gap between these being sealed by a cylindrical bellows 24, made of a heat-resistant alloy.

The function of the shell-like ducts 22C, which are machined from metal castings, is to afford, over a short axial distance, a change from the circular cross-section of the associated duct 22B to a substantially elliptical cross-section where each duct 22C adjoins the corresponding face of the matrix 2. The shape of each duct 22C, which has internal stiffening ribs 25, can be seen from FIGURES 5 and 12.

A seal 26, consisting of a material compatible with that of the matrix 2, is brazed or otherwise secured to each of the quasi-elliptical ducts 22C; and these ducts are of such a size that each covers approximately from one-third to one-half of the area of the corresponding face of the matrix 2. Although the seals 26 are themselves rigid, the ducts 22C are mounted on the bellows 24 which afford flexibility, enabling the ducts 22C to assume a position conformable to any movement of the matrix 2.

The back of each of the ducts 22C is formed with two seatings 27 (FIGS. 8 and 9), disposed symmetrically with respect to the axis of rotation of the matrix 2, each of these seatings accommodating a pressure-capsule which is constituted by a cylindrical metal bellows 28 (FIG. 6) that reacts against the corresponding casing part 1A or 1B. The purose of the pressure-capsules 28 is to control the contact-pressure between the seals 26 and the matrix 2, to achieve satisfactory sealing with the minimum of friction. The pressure in the capsules 28 can either be maintained constant, by employing pressure-fluid from a hydraulic or pneumatic source, or the pressure can be varied in accordance with the pressure at the outlet of the compressor of the gas turbine unit. Should the pressure derived from that source prove inadequate, some form of differential pressure-increasing device could be used.

Figure 3:
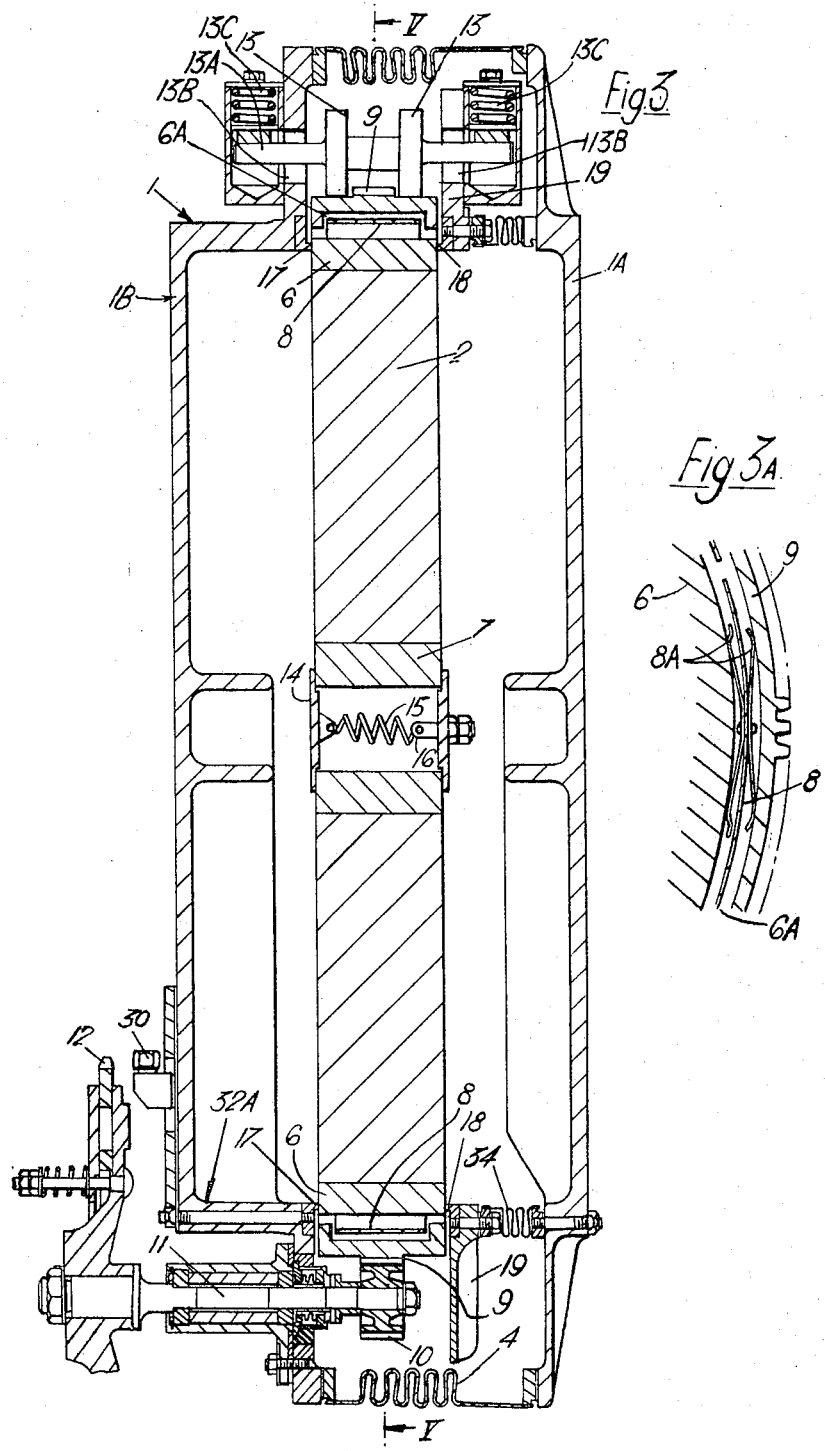
FIGURES 3 and 4 are enlarged sections on the lines III—III and IV—IV respectively in FIGURE 1.
Figure 4:
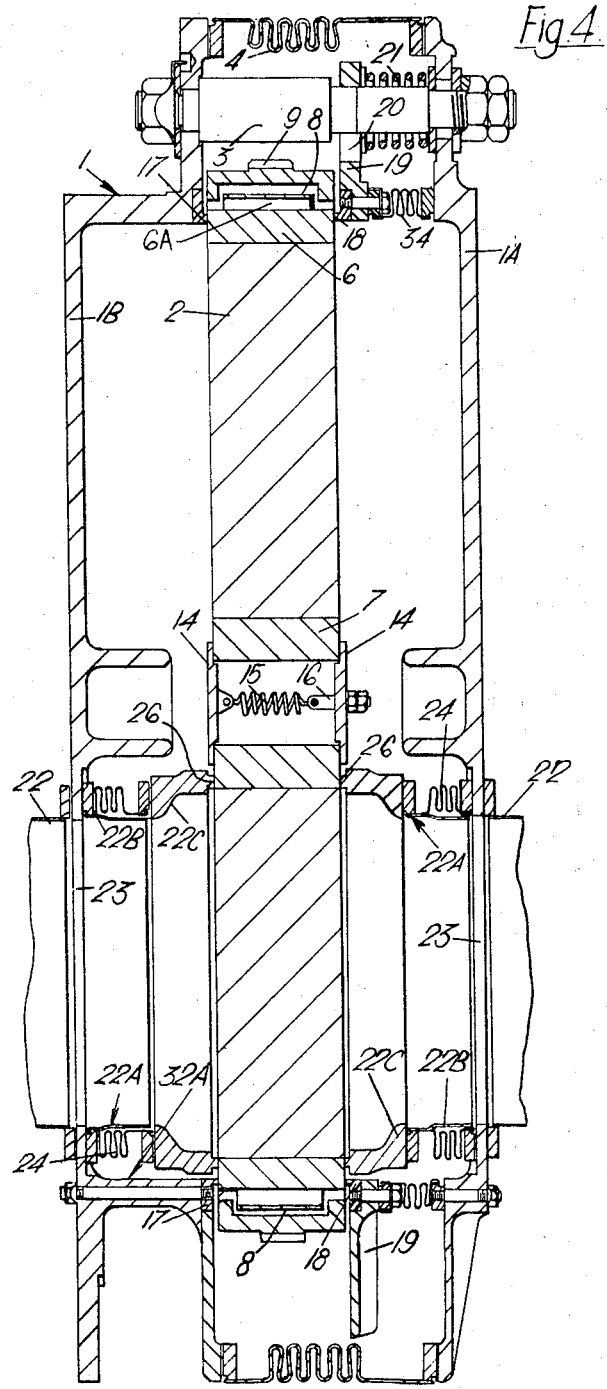
Figure 5:
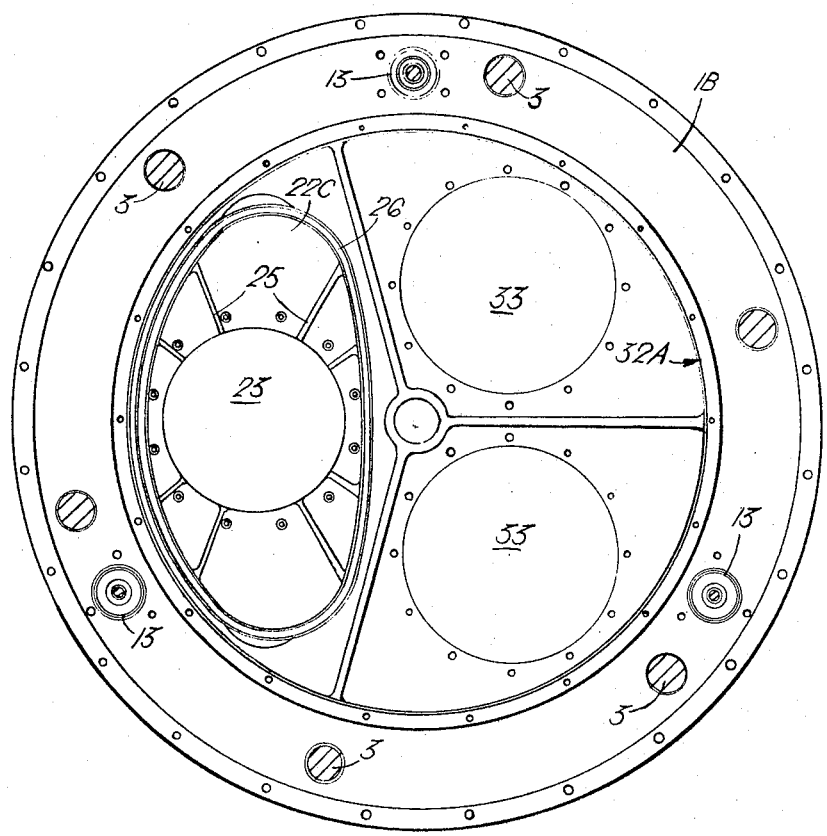
FIGURE 5 is a section on the line V—V in FIGURE 3, but with the matrix removed.

The pressure-capsules 28 each have a threaded hole 29 for attachment of a connecting pipe (not shown) leading from a pressure-fluid feed connection 30 (FIG. 3). The seatings 27 on the ducts 22C each have a central socket 31 which serves to receive a locating pin (not shown), in case such provision should be found necessary.

The exhaust gases from the gas turbine are conveyed through ducting which is bifurcated so that two exhaust ducts 32 (FIGS. 1 and 2) adjoin both the inlet and outlet ends of the heat-exchanger casing 1. The exhaust ducts 32 register with corresponding apertures 33 (FIG. 5) in the casing parts 1A and 1B, to which these ducts are respectively bolted. The arrangement is such that each of the intake-air ducts 22A is entirely surrounded by, and is in contact with, the exhaust gases flowing through the casing 1 of the heat-exchanger; this casing, in effect, affording an exhaust duct 32A (FIGS. 3 to 6) of circular cross-section, concentric with the axis of the matrix 2 and entirely surrounding the intake-air ducts 22A. A cylindrical metal bellows 34 (FIGS. 3, 4 and 6), which is provided between the casing part 1A and the plate 19, constitutes a portion of the exhaust duct 32A.

In the modification depicted in FIGURE 7, the annular plate 19 (FIGS. 3, 4 and 6) and its associated bellows 34 are replaced by a casing part 35 which abuts the adjoining face of the matrix 2 through a resiliently-mounted seal 36; the casing part 35 serving as a duct for the exhaust gases. Also, in this case intake-air ducts 37 of another design (see FIGS. 14 and 15) are employed. These ducts, which are of quasi-elliptical cross-section, comprise a casting of malleable iron that is bolted (as at 38 in FIG. 7) to the casing parts 1A and 1B. A seal 39, of so-called "pyrolithic" carbon (or other high-temperature sealing material compatible with the ceramic matrix 2), is secured to a heat-resistant alloy ring 40 which is resiliently mounted on the casting of the duct 37 by a pair of rings 41 of the same steel alloy. The rings 41, which are each formed with a single corrugation, are disposed back to back and are surrounded by a sheath 42 of the same material which is flanged at one end and attached to the casting of the duct 37. The seal 39 is composed of segments which are fixed to the ring 40 by pegs 43 (FIG. 17). The rings 41, carrying the seal 39, constitute a bellows which is arranged to be pressurized by fluid supplied through a drilling 50 (FIG. 16) in the wall of the duct 37.

FIGURE 18 shows a modification with rings 41A arranged so that their single corrugations overlap, and FIGURE 19 shows rings 41B with overlapping V-section single corrugations. In FIGURE 20, rings 41C of bellows-like construction are employed with their corrugations disposed back to back, and FIGURE 21 shows a corresponding arrangement of rings 41D with V-section corrugations.

An alternative design of air duct to that of FIGURE 14 is illustrated in FIGURES 22 to 25. In this case the duct 44 is fabricated from heat-resistant alloy, and is formed with a corrugation 45. It has at one end a ring 46 for bolting it to the corresponding one of the casing parts 1A or 1B, as the case may be. At its other end the duct 44 has a ring 47, on which is mounted a seal 48 which abuts the corresponding face of the matrix 2. The duct 44 is surrounded by a sheath 49, of the same material, which is mounted at one end on the ring 47.

The duct 44 can, alternatively, be of bellows-like construction, with V-section corrugations 44A (FIG. 26) or rounded corrugations 44B (FIG. 27).

We claim:

1. A regenerative heat-exchanger of the kind having a rotary disc-type matrix enclosed in a casing, and designed to transfer heat from the exhaust gases of a gas turbine to the intake-air supplied to the turbine by an associated compressor; in which the casing contains aligned intake-air ducts which have a substantially elliptical cross-section where they resiliently abut opposite faces of the matrix through interposed fluid-pressurized sealing means conforming to the contour of the associated duct and enclosing approximately from one-third to one-half of the face area of the matrix, and in which the intake-air ducts within the casing are entirely surrounded by, and are in contact with, the exhaust gases flowing through the casing, said casing comprising two main castings of substantially circular form, spaced apart axially by at least three tie members which constrain them from axial separation, and interconnected by a cylindrical heat-resistant bellows sealing the casing at its periphery.

2. A regenerative heat-exchanger according to claim 1 in which the intake-air ducts within the casing are of composite construction, each comprising a cylindrical duct and an adjoining shell-like duct of quasi-elliptical cross-section, the axial gap between these two ducts being sealed by a cylindrical heat-resistant bellows, the back of each shell-like duct being formed with two seatings disposed symmetrically with respect to the axis of rotation of the matrix, each of these seatings accommodating a pressure-capsule which is supplied with pressure-fluid and which controls the contact-pressure between the matrix and the respective sealing means.

3. A regenerative heat-exchanger according to claim 2, in which exhaust gas ducting within the casing is constituted in part by a cylindrical metal bellows extending between the casing and a floating annular plate, said plate having seal means contacting one rim of the matrix, said plate being mounted slideably on said tie members and spring-loaded to maintain sealing contact with the matrix rim, other seal means sealing the casing to the other rim of the matrix.

4. A regenerative heat-exchanger according to claim 3, in which the matrix is centralised, and supported, by three equi-spaced sets of rollers which bear upon its rim.

References Cited by the Examiner
UNITED STATES PATENTS

| | | | |
|---|---|---|---|
| 2,942,857 | 6/1960 | Lyle et al. | 165—9 |
| 3,039,265 | 6/1962 | Williams et al. | 165—9 X |
| 3,167,115 | 1/1965 | Chute | 165—7 |
| 3,204,969 | 9/1965 | Williams | 165—9 X |

MEYER PERLIN, *Primary Examiner.*

ROBERT A. O'LEARY, *Examiner.*

A. W. DAVIS, *Assistant Examiner.*